(12) United States Patent
Bao et al.

(10) Patent No.: US 12,279,716 B2
(45) Date of Patent: Apr. 22, 2025

(54) DOMESTIC KITCHEN APPARATUS

(71) Applicant: KONINKLIJKE PHILIPS N.V., Eindhoven (NL)

(72) Inventors: Wei Shun Bao, Eindhoven (NL); Weimin Xiao, Eindhoven (NL); Zhongchi Luo, Eindhoven (NL); Ming Li, Eindhoven (NL); Xiao Yun Kui, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/032,135

(22) PCT Filed: Mar. 23, 2022

(86) PCT No.: PCT/EP2022/057692
§ 371 (c)(1),
(2) Date: Apr. 14, 2023

(87) PCT Pub. No.: WO2022/207434
PCT Pub. Date: Oct. 6, 2022

(65) Prior Publication Data
US 2023/0389750 A1     Dec. 7, 2023

(30) Foreign Application Priority Data

Mar. 31, 2021  (WO) ................ PCT/CN2021/084511
Aug. 4, 2021  (EP) ..................................... 21189665

(51) Int. Cl.
*A47J 37/06*      (2006.01)
*A47J 27/086*     (2006.01)
(Continued)

(52) U.S. Cl.
CPC .......... *A47J 36/321* (2018.08); *A47J 27/086* (2013.01); *A47J 37/0629* (2013.01);
(Continued)

(58) Field of Classification Search
CPC ................ A47J 37/0641; A47J 37/0623; A47J 37/0629; A47J 37/9754; A47J 37/1266; F24C 7/085; F24C 3/128; H04N 13/236
See application file for complete search history.

(56) References Cited

U.S. PATENT DOCUMENTS 7,696,454 B2  4/2010  Nam et al.
10,760,794 B2  9/2020  Cheng
(Continued)

FOREIGN PATENT DOCUMENTS

AU  2018215274 A1  9/2019
CN  101548136 A    9/2009
(Continued)

OTHER PUBLICATIONS

Extended European Search Report issued in connection with corresponding EP Application No. 21189665.9 dated Feb. 9, 2022.

*Primary Examiner* — Reginald Alexander
(74) *Attorney, Agent, or Firm* — Maschoff Brennan

(57) ABSTRACT

Provided is a domestic kitchen apparatus including a food chamber for receiving food. The domestic kitchen apparatus includes an optical range sensor for optical range sensing. The optical range sensor has at least one optical sensing element. The domestic kitchen apparatus further includes, as a separate component provided in addition to the optical range sensor, a reflector assembly. The reflector assembly reflects light directed from the food received in the food chamber onto the at least one optical sensing element.

13 Claims, 8 Drawing Sheets

(51) Int. Cl.
*A47J 36/32* (2006.01)
*F24C 7/08* (2006.01)
*A47J 27/04* (2006.01)

(52) U.S. Cl.
CPC ....... *A47J 37/0635* (2013.01); *A47J 37/0641* (2013.01); *F24C 7/085* (2013.01); *A47J 2027/043* (2013.01); *A47J 37/0623* (2013.01)

(56) References Cited

U.S. PATENT DOCUMENTS

| | | |
|---|---|---|
| 10,819,905 B1 | 10/2020 | Liu et al. |
| 2010/0128755 A1* | 5/2010 | Luckhardt ............ H05B 6/6455 |
| | | 374/134 |
| 2016/0327279 A1 | 11/2016 | Bhogal et al. |
| 2018/0292092 A1 | 10/2018 | Bhogal |
| 2020/0245809 A1* | 8/2020 | Klasmeier ................ A23L 5/13 |
| 2021/0071871 A1* | 3/2021 | Stork-Wersborg ...... F24C 7/085 |
| 2023/0039201 A1* | 2/2023 | Bhogal ................... F24C 7/087 |

FOREIGN PATENT DOCUMENTS

| | | |
|---|---|---|
| CN | 102455221 A | 5/2012 |
| CN | 203824924 U | 9/2014 |
| CN | 106535384 A | 3/2017 |
| CN | 107535024 A | 1/2018 |
| CN | 108474562 A | 8/2018 |
| CN | 108542273 A | 9/2018 |
| CN | 109475255 A | 3/2019 |
| CN | 209202888 U | 8/2019 |
| CN | 110520022 A | 11/2019 |
| CN | 210697149 U | 6/2020 |
| CN | 111386430 A | 7/2020 |
| KR | 19980050563 A | 9/1998 |
| KR | 19980053941 A | 9/1998 |
| KR | 101052137 B1 | 7/2011 |
| WO | 2018019620 A1 | 2/2018 |

* cited by examiner

DOMESTIC KITCHEN APPARATUS

CROSS-REFERENCE TO RELATED APPLICATIONS

The present application is a U.S. National Phase application under 35 U.S.C. § 371 of International Application No. PCT/EP2022/057692, filed on Mar. 23, 2022, which claims the benefit of European Patent Application No. 21189665.9, filed on Aug. 4, 2021 and International Application No. PCT/CN2021/084511, filed on Mar. 31, 2021. This application is hereby incorporated by reference herein.

FIELD OF THE INVENTION

This invention relates to a domestic kitchen apparatus having a food chamber, and being equipped with an optical range sensor configured to sense a path length from food received in the food chamber to the optical range sensor.

BACKGROUND OF THE INVENTION

There is currently a desire to incorporate technologies into kitchen apparatuses, and in particular domestic kitchen appliances, which facilitate food preparation. Cameras have been incorporated into kitchen appliances to assist in, for example, identifying the type of food being prepared, selecting a cooking method or cooking conditions, determining the doneness level of the food being prepared, determining the nutrient content of the food, and so on.

Optical range sensors, e.g. stereo cameras, such as dual/3D cameras, can be particularly useful for food sensing in domestic kitchen apparatuses because of the depth/range information they can provide. Such depth information can, for example, be used to determine the volume of food received in the food chamber of the apparatus and/or to assist with the identification of the type of food being prepared using the domestic kitchen apparatus.

Certain technical challenges have nonetheless been encountered during attempts to incorporate such an optical range sensor in a domestic kitchen apparatus, such as a domestic cooking appliance.

AU 2018 215 274 A1 discloses a cooker provided with means for measuring swelling of a food product.

SUMMARY OF THE INVENTION

The invention is defined by the claims.

According to examples in accordance with an aspect of the invention, there is provided a domestic kitchen apparatus comprising: a food chamber for receiving food; an optical range sensor configured for optical range sensing, the optical range sensor having at least one optical sensing element; and a reflector assembly, wherein the reflector assembly is arranged to reflect light directed from the food received in the food chamber onto the at least one optical sensing element.

Incorporation of optical range sensors into domestic kitchen apparatuses, e.g. for the purpose of assisting to identify the food and/or determine the volume of the food received in the food chamber, has been found to present certain technical challenges. In particular, the confined space within the food chamber may mean that the food is closer to the at least one optical sensing element of the optical range sensor than the lower limit of the detection distance/depth range of the optical range sensor. Whilst some optical range sensors, e.g. dual/3D cameras, can be customized in order to reduce the minimum detection distance, e.g. to about 5 cm, sensing difficulties can still be encountered when the food chamber is so full of food that the distance between the at least one optical sensing element and the food is smaller than the (customized) minimum detection distance.

The detection distance/depth range of the optical range sensor may be defined by the minimum distance and the maximum distance at which the optical range sensor is capable of providing, e.g. specified to provide, optical range sensing.

In the case, for example, of a stereo camera, the minimum distance of the depth range may correspond to the smallest distance to which the stereo camera can focus.

The reflector assembly included in the domestic kitchen apparatus according to the present disclosure, as a separate component provided in addition to the optical range sensor, may assist to increase the path length between the at least one optical sensing element and the food received in the food chamber. This is due to the light directed from the food being required to first travel to the reflector assembly, e.g. reflector lens, and then be reflected from the reflector assembly to the at least one optical sensing element, rather than travelling directly to the at least one optical sensing element.

Increasing the path length in this manner may assist to bring the path length to within the detection distance/depth range of the optical range sensor. The reflector assembly may, for example, assist with focussing the image of the food received in the food chamber onto each of the at least one optical sensing element of the optical range sensor.

The width of the view provided to the optical range sensor at a certain distance may be proportional to the distance between the optical range sensor and the food, and the viewing angle, which may be fixed for a fixed optics range sensor, e.g. dual/3D camera. The path length extension provided by the reflector assembly may thus assist in covering, for instance, a proximal part of the scene within the food chamber.

The detection distance/depth range of the optical range sensor may have a lower limit which is larger than the largest dimension of the food chamber. This may risk hampering optical range sensing in an apparatus in which light from the food is directly incident on the optical sensing element(s), even with such an element or elements being positioned in the food chamber as far away as possible from the food. However, this potential problem is alleviated by the increased path length to the at least one optical sensing element provided by the reflector assembly.

Alternatively or additionally, the detection distance/depth range of the optical range sensor may have a lower limit which is larger than a height dimension of the food chamber.

The largest dimension and/or height dimension of the food chamber may be equal to or smaller than 0.35 m, for example 0.15 m to 0.25 m, such as 0.2 m to 0.25 m. Alternatively or additionally, the optical range sensor may have a depth range whose lower limit is 0.2 m to 0.3 m. For example, the overall depth range may be 0.2 m to 4 m, such as 0.2 m to 3 m, or 0.3 m to 4 m.

The height dimension of the food chamber may correspond to the dimension of the food chamber which extends upwardly or vertically from a base of the food chamber when the domestic kitchen apparatus is orientated for use.

Thus, filling of the food chamber from its base may be in the upwards direction along which the height dimension extends. The optical range sensor and the reflector assembly may, for example, be arranged to detect the degree of filling of the food chamber in this upwards direction.

In some embodiments, the food chamber has width, length and height dimensions, and the sum of the height and width dimensions or the sum of the height and length dimensions is equal to or larger than the minimum depth range of the optical range sensor. This may assist to ensure that the path length extension provided by the reflector assembly satisfies the minimum depth range of the optical range sensor.

In an embodiment, a range of path lengths to the at least one optical sensing element via the reflector assembly is defined from the base of the food chamber to from a level of maximum capacity of the food chamber. In this case, the optical range sensor is configured to have a depth range which is satisfied by the range of path lengths.

In examples in which the optical range sensor comprises a stereo camera, difficulties can be encountered in terms of focussing an image of the food received in the food chamber onto the stereo camera when the stereo camera is closer to the food than the lower limit of the detection distance/depth range. The path length extension provided by the reflector assembly may alleviate such focussing issues, and may thus facilitate optical range sensing using such a stereo camera.

The domestic kitchen apparatus may comprise, or be in the form of, a domestic cooking appliance, in particular a domestic cooking appliance of limited dimensions, such as an air fryer, a steamer, a pressure cooker, a rice cooker, a soup maker or a blender.

In this respect, the domestic kitchen apparatus may have cooking functionality, e.g. with one or more heating elements being included in the kitchen apparatus for heating food received in the food chamber.

Alternatively or additionally, the domestic kitchen apparatus may have food processing functionality, e.g. with one or more elements for cutting, grinding, blending and/or whisking food received in the food chamber.

When the optical range sensor and the reflector assembly are included in a domestic kitchen apparatus having food processing functionality, for example a blender, the optical range sensor may assist to measure the volume of foodstuff, such as the volume of pieces of fruit or vegetables, contained in the food chamber.

The size of the food chamber in such a domestic kitchen appliance may be relatively limited. For example, the largest dimension of the food chamber of such a domestic kitchen appliance may be equal to or smaller than 0.35 m, more particularly equal to or smaller than 0.25 m. Thus, the path length increasing principle of the present disclosure can be advantageously applied in such domestic kitchen appliances.

The at least one optical sensing element may comprise a pair of spatially separated image sensors, and the pair of image sensors may be arranged to receive respective images of the food received in the food chamber reflected by the reflector assembly.

In this case, the pair of image sensors may be arranged such as to provide two camera points which each receive (reflected) rays from the food received in the food chamber. Estimation of the distance to a point on the food received in the food chamber may be based on triangulation: the point on the food and the two camera points forming a triangle. The distance may be determined from the baseline distance between the two camera points and the angle formed by the rays incident on the camera points.

The baseline distance may be, for example, 30 to 50 mm, such as 40 mm.

The optical range sensor may comprise a light source for illuminating the food received in the food chamber. The light source may assist to ensure that sufficient light is directed from the food to the reflector assembly for the optical range sensor to be able to operate. Any suitable light source, e.g. a visible light and/or infra-red light source, can be used for this purpose.

The light source may, for example, comprise a projector spaced apart from each of the at least one optical sensing element, which projector is configured to emit structured light towards the food received in the food chamber. Such structured light being projected to the food, directed from the food to the reflector assembly, and reflected onto the at least one optical sensing element, may be utilised for the optical range sensing, e.g. using a so-called active triangulation optical range sensing principle.

In an embodiment, the food chamber is defined by a first part for receiving the food, and a second part on which the optical range sensor and the reflector assembly are arranged. The first and second parts may be moveable relative to each other such as to permit light directed from different areas of the food received in the food chamber to be incident on the reflector assembly and reflected onto the at least one optical sensing element. This may enable more of the food chamber to be captured by the optical range sensor.

The first and second parts may, for instance, be rotatable relative to each other such as to permit light directed from different areas of the food received in the food chamber to be incident on the reflector assembly and reflected onto the at least one optical sensing element.

The second part may, for example, define a lid of the food chamber, and the first part may define a body of the food chamber. The lid may be moveable, e.g. rotatable, with respect to the body in order to enable the optical range sensor to capture different portions of the food chamber.

The reflector assembly may comprise a curved reflector lens arranged to focus the light directed from the food received in the food chamber towards the at least one optical sensing element. Such a curved reflector lens, e.g. comprising or in the form of a parabolic reflector, may assist to extend the view of the food chamber provided to the optical range sensor.

Alternatively or additionally, the reflector assembly may comprise at least one reflective surface which is moveable relative to the food chamber such as to permit light directed from different areas of the food received in the food chamber to be reflected onto the at least one optical sensing element.

Such a moveable reflective surface may assist to increase the breadth of the detection region. A planar reflective surface may, for instance, be employed in this example, thereby to assist in reducing any image distortion, e.g. relative to the scenario in which the curved reflector lens is included in the reflector assembly.

The domestic kitchen apparatus may comprise a heater, and a circulation system configured to define a predominant airflow direction through the domestic kitchen apparatus and past the heater.

The optical range sensor is preferably arranged such that the predominant airflow direction extends across each of the at least one optical sensing element. By the airflow being directed across, rather than towards, the at least one optical sensing element, the optical sensing element may be better protected from damage and/or interference due to the circulating hot air.

The food chamber may be at least partly defined by a sidewall area extending between opposing end wall areas. In this case, the predominant airflow direction may extend between the opposing end wall areas, with the at least one optical sensing element being arranged at the sidewall area. In this manner, the predominant airflow direction extends across the at least one optical sensing element, thereby to minimise damage and/or interference to the at least one optical sensing element caused by the circulating hot air.

A further sidewall area may oppose the sidewall area across the food chamber. In this case, the reflector assembly may be at and/or extend from the further sidewall area. Thus, the reflector assembly reflects light across the food chamber from the further sidewall area to the sidewall area. This may contribute to the above-described path length increase, and thereby facilitate the optical range sensing.

The domestic kitchen apparatus may comprise an outer chamber defined by a wall, with the food chamber being provided inside the outer chamber. The at least one optical sensing element and/or the reflector assembly may be at, e.g. mounted on, the wall of the outer chamber. This may assist to protect the at least one optical sensing element from damage and/or interference associated with the cooking process taking place within the food chamber.

The at least one optical sensing element may, for example, be at, e.g. mounted on, a portion of the wall across which the above-described predominant airflow direction extends, e.g. in a duct located between the food chamber and the wall of the outer chamber.

In at least some embodiments, the optical range sensor and/or the reflector assembly may be built-in, in other words integral, to the kitchen apparatus, e.g. domestic kitchen appliance.

More generally, each of the at least one optical sensing element, or the optical range sensor as a whole, may be provided with a heat resistive coating and/or may be enclosed in a heat resistive compartment for protection from heat which may be generated within the domestic kitchen apparatus, particularly in embodiments in which a heater is included in the apparatus. At least a portion of the coating or the compartment may be optically transparent in order that light can reach the at least one optical sensing element.

Alternatively or additionally, a heat resistive coating and/or heat resistive compartment may be employed to coat or house at least a portion of the reflector assembly. At least a portion of the heat resistive coating or the heat resistive compartment may be optically transparent in order that the reflector assembly can receive light from the food in the food chamber and direct the light towards the at least one optical sensing element.

The kitchen apparatus according to any of the above-described embodiments may comprise a processor configured to determine at least one parameter relating to a characteristic of the food received in the food chamber based on the range sensed by the optical range sensor.

The at least one parameter may, for example, comprise a filling dimension of the food received in the food chamber, e.g. a filling dimension extending from a base of the food chamber towards a maximum filling level of the food chamber. In some examples, the at least one parameter comprises a volume of the food received in the food chamber.

According to another aspect there is provided a method of sensing range in a food chamber of a cooking device, such as a domestic kitchen apparatus, comprising an optical range sensor having at least one optical sensing element, the method comprising: using a reflector assembly to reflect light directed from food received in the food chamber onto the at least one optical sensing element.

Embodiments described herein in respect of the domestic kitchen apparatus may be applicable to the method, and embodiments described herein in respect of such a method may be applicable to the domestic kitchen apparatus.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
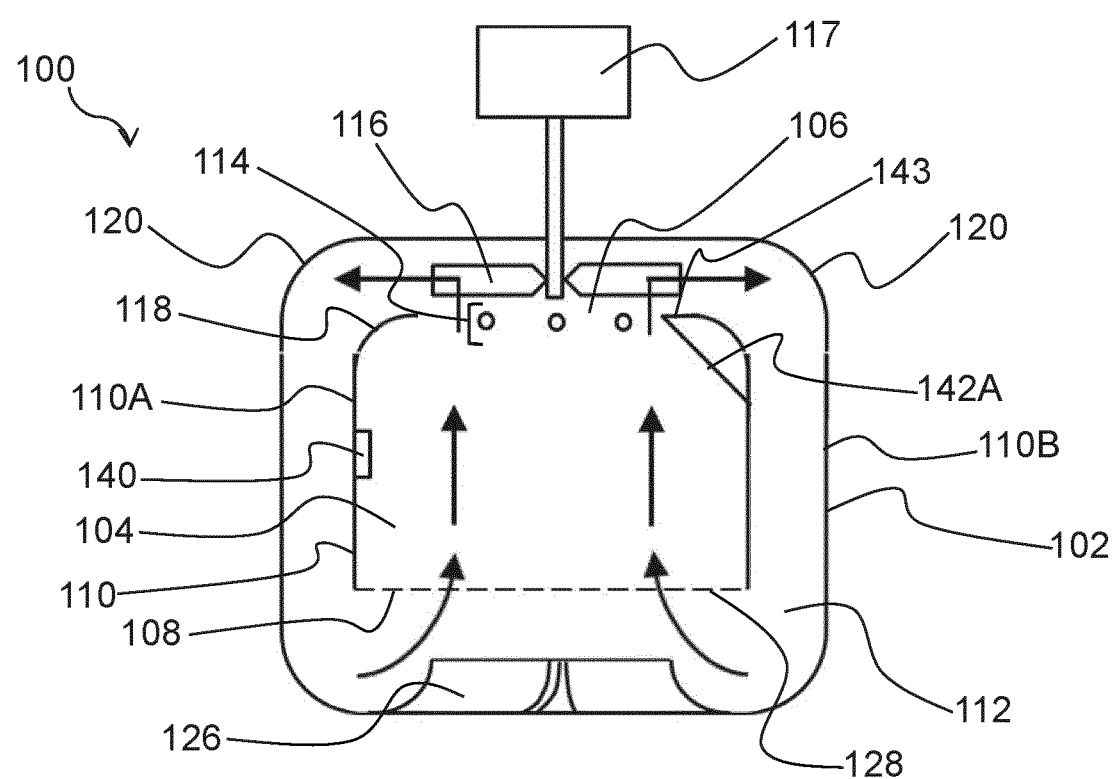
FIG. 1 provides a schematic cross-sectional view of a domestic kitchen apparatus according to a first example.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an apparatus, e.g. a domestic kitchen apparatus, comprising a food chamber for receiving food. The apparatus includes an optical range sensor configured for optical range sensing. The optical range sensor has at least one optical sensing element. The apparatus comprises, as a separate component provided in addition to the optical range sensor, a reflector assembly. The reflector assembly is arranged to reflect light directed from the food received in the food chamber onto the at least one optical sensing element.

FIG. 1 shows a domestic kitchen apparatus 100. The domestic kitchen apparatus 100 in this particular non-limiting example takes the form of an air fryer.

More generally, the domestic kitchen apparatus 100 may comprise, or be in the form of, any type of domestic cooking or food preparation appliance. Particular mention is made of a domestic cooking appliance, such as an air fryer, steamer, pressure cooker or rice cooker, due to the internal space limitations of such domestic cooking appliances. The present disclosure enables optical range sensing to be employed in such domestic cooking appliances in spite of their internal space limitations, as will be described in more detail herein below.

In the non-limiting example shown in FIG. 1, the domestic kitchen apparatus 100 comprises an outer chamber defined by a wall 102. A food chamber 104 is located inside the outer chamber. The food chamber 104 has a first opening 106 and a second opening 108 opposing the first opening 106. The cooking chamber 104 is at least partly delimited by a further wall 110.

As shown in FIG. 1, the further wall 110 extends between the first opening 106 and the second opening 108. In this non-limiting example, a duct 112 is defined by a space between the wall 102 and the further wall 110. The duct 112 provides a fluid connection between the first opening 106 and the second opening 108.

The domestic kitchen apparatus 100 also includes a heater 114 for heating the food chamber 104 and/or the air circulating in the domestic kitchen apparatus 100. In the non-limiting example shown in FIG. 1, the heater 114 is mounted within the food chamber 104. In alternative examples, the heater 114 is located elsewhere in the domestic kitchen apparatus 100, such as above or below food chamber 104 or elsewhere in the duct 112.

In an embodiment, the domestic kitchen apparatus 100 comprises a circulation system 116, 117 configured to define a predominant airflow direction through the domestic kitchen apparatus 100. One possible example of such a predominant airflow direction is represented in FIG. 1 by the arrows.

The circulation system 116, 117 may comprise, or take the form of, a fan 116 driven by a motor 117, as shown in FIG. 1.

The heater 114 may heat the food (not shown) received in the food chamber 104 directly, but may alternatively or additionally heat the air which is circulated in the domestic kitchen apparatus 100 by the circulation system 116, 117. The heater 114 may thus be arranged to permit the air circulating in the domestic kitchen apparatus 100 to pass it, e.g. to pass through it, thereby to transfer heat to the circulating air.

The heater 114 may comprise any suitable heating element. The heater 114 may, for example, comprise a resistive heating element, e.g. a spiral heating element. Such a spiral heating element 114 is shown in the example depicted in FIG. 1: the three spatially separated circles across the food chamber 104 representing the cross-section of the spiral heating element. In the case of a spiral heating element, the circulating air may pass through gaps between coils of the heating element. Such heater 114 designs for domestic kitchen apparatuses 100 are well-known per se, and will not be further described herein for the sake of brevity only.

In this non-limiting example, the fan 116 is arranged to draw air from at least one axial direction and to eject the air radially, as represented by the arrows in FIG. 1. This arrangement of the circulation system 116, 117 assists to provide the above-described predominant airflow direction through the domestic kitchen apparatus 100.

In the non-limiting example shown in FIG. 1, the first and second openings 106, 108 oppose each other across the food chamber 104. In this manner, the predominant direction of the airflow through the food chamber 104 is from the second opening 108 to the first opening 106, as shown in FIG. 1. Alternatively (not shown), the predominant direction of the airflow may be from the first opening 106 to the second opening 108.

As shown in FIG. 1, the further wall 110 may comprise a wall member 118, delimiting the first opening 106. This wall member 118 may serve as an air guide member, helping to guide the airflow generated by the circulation system 116, 117 in a desired predominant direction, e.g. around the food chamber 104 towards the second opening 108, as shown in FIG. 1. In alternative examples, at least part of the wall member 118 may be omitted. An example of this will be explained in more detail herein below with reference to FIG. 2.

The outer chamber 102 may comprise, or define, a heat shield 120. The heat shield 120 may assist to prevent the heat within and surrounding the cooking chamber 104 from reaching external surfaces of the domestic kitchen apparatus 100 and/or damaging electronic components (not visible) of the domestic kitchen apparatus 100 external to the outer chamber. The heat shield 120 may be formed from any suitable material, such as a metal or metal alloy, e.g. steel. The heat shield 120 is preferably formed from galvanized plate metal.

In some non-limiting examples, the domestic kitchen apparatus 100 comprises another air guide member 126 in the duct 112. The air guide member 126 may assist to guide air from the duct 112 towards and through the second opening 108, as schematically depicted in FIG. 1. The air guide member 126 is preferably mounted in the duct 112 opposite the second opening 108.

Any suitable design may be contemplated for the air guide member 126. The air guide member 126 may, for example, comprise a so-called star-fish shape. The star-fish shape comprises a plurality of radial fins which are shaped to guide air in the duct 112 towards and through the second opening 108.

The second opening 108 may, in a non-limiting example, be defined by the apertures of a perforate wall 128. The perforate wall 128 may define a platform on which food for cooking/baking/frying/steaming may be placed. The food chamber 104 may, for example, be regarded as a basket having a bottom portion corresponding to the perforate wall 128, with the further wall 110 comprising a sidewall area 110A extending between a pair of opposing end wall areas in which the second opening 108/perforate wall 128 and the first opening 106 are respectively defined.

The outer chamber 102 and the food chamber 104 may be openable, for example by a lid (not shown), e.g. a hinging lid, in order that food and/or at least part of the food chamber 104 may be placed into and removed from the outer chamber 102. In other examples, the food chamber 104 may be openable by a portion of the outer chamber 102 and the food chamber 104 defining a drawer which can be displaced from the remainder of the outer chamber 102 and the food chamber 104.

More generally, the domestic kitchen apparatus 100 comprises an optical range sensor 140 configured for optical range sensing. The optical range sensor 140 is configured to enable optical measurement of depth. To this end, the optical range sensor 140 comprises at least one optical sensing element.

It is noted that the terms "depth", "range" and "distance" are used interchangeably herein in relation to the sensing provided by the optical range sensor, and refer to the path length sensed between the optical range sensor 140 and the food received in the food chamber 104.

The capability to measure or sense this depth/range/distance can assist in determination of at least one parameter relating to a characteristic of the food received in the food chamber 104.

For example, the optical range sensor 140 may be configured to measure the path length (via a reflector assembly as will be described in more detail herein below) from the optical range sensor 140 to one or more points on the food received in the food chamber 104.

This path length may increase or decrease with contraction or expansion of the food within the food chamber 104 during cooking. This may assist in determination of the level of preparedness or doneness of the food, as will be further described herein below.

The path length may also decrease with increasing filling of the food chamber 104 with food. This is because increased filling of the food chamber reduces the distance from a surface, e.g. an uppermost surface, of the food to the optical range sensor 140.

The at least one parameter may, for example, comprise a filling dimension of the food received in the food chamber 104. The filling dimension may, for example, be determined via the optical range sensor 140 measuring the distance to one or more surfaces of the food received in the food chamber 104.

The filling dimension determination may, for example, account for the height dimension of the food chamber 104, which height dimension corresponds to the dimension of the food chamber 104 which extends upwardly or vertically from a base of the food chamber 104 when the domestic kitchen apparatus 100 is orientated for use. Thus, filling of the food chamber 104 from its base may be in the upwards direction along which the height dimension extends.

In some non-limiting examples, the at least one parameter comprises a volume of the food received in the food chamber 104. By, for instance, the optical range sensor 140 measuring the path length to one or more surfaces of the food received in the food chamber 104, and accounting for the dimensions of the food chamber 104, including its height, the volume of the food received in the food chamber 104 can be estimated.

Such information can, for example, be used to adjust the settings of the domestic kitchen apparatus 100 and/or to provide cooking setting options via a user interface (not visible) which are tailored to the at least one parameter.

Such cooking settings and/or cooking setting options can, for example, comprise the speed of airflow provided by the circulation system 116, 117, e.g. via controlling the speed at which the motor 117 rotates the fan 116. Alternatively or additionally, the cooking settings/setting options can comprise the cooking temperature and/or cooking duration. Such cooking temperature and/or cooking duration control can be implemented via the control over the heating provided by the heater 114.

For example, a relatively large determined volume of food received in the food chamber 104 may require a more prolonged cooking duration and/or a higher cooking temperature than a smaller determined volume of food received in the food chamber 104.

In other examples, the depth measurement provided by the optical range sensor 140 can be used to assist in identification of particular foodstuffs. The cooking settings and/or cooking setting options may, for instance, be controlled according to the identified foodstuff.

In an embodiment, the optical range sensor 140 comprises a stereo camera. Such a stereo camera may be configured to acquire two or more input images in order to estimate the distance to one or more points on the food received in the food chamber 104.

More generally, light from the food is reflected to the optical range sensor 140 by a reflector assembly 142A, as will be described in more detail herein below.

A first path length from the reflector assembly 142A to the optical range sensor 140 may be fixed or may be known for a given arrangement of the reflector assembly 142A with respect to the optical range sensor 140. A second path length may be defined between one or more points on the food received in the food chamber 104 and the reflector assembly 142A. This second path length may vary according to the degree of filling of the food chamber 104 and/or due to changes to the food during preparation, e.g. cooking and/or processing, in the food chamber 104.

The path length, in other words the total path length, measured by the optical range sensor 140 between the one or more points on the food and the optical range sensor 140 may be the sum of the first path length and the second path length. Measurement of the (total) path length by the optical range sensor 140 may thus enable determination of the second path length, on the basis of the first path length being fixed or known. Thus, dimensional changes to the food during preparation, e.g. cooking or processing, and/or the degree of filling of the food chamber 104 may be determined.

The above-described filling dimension may, for example, be determined by the geometric relation between the second path length (or a measure of the distance from the top of the food chamber 104 to the one or more points on the food as determined using the second path length) and the height dimension of the food chamber 104.

A volume of food received in the food chamber 104 may, in certain examples, be determined by multiplying the determined filling dimension by the length and width dimensions of the food chamber 104 or by the length and width of the food itself, e.g. as measured via a camera provided in addition to the optical range sensor, as described herein below.

In examples in which the optical range sensor 140 comprises a stereo camera, the two or more input images are reflected to the stereo camera by the reflector assembly 142A. The two or more input images may be received by any suitable imaging sensor arrangement.

For example, the two or more input images may be received by respective image sensing portions of an imaging array, such as a charge-coupled device (CCD) array or complementary metal-oxide-semiconductor (CMOS) array. Alternatively, the two or more input images may be received by respective/distinct imaging arrays, e.g. respective/distinct CCD arrays or respective/distinct CMOS arrays.

In some embodiments, the domestic kitchen apparatus 100 comprises a camera, in other words an additional camera, for providing an image of the interior of the food chamber 104. This camera is in addition to the optical range sensor 140. The image from the camera may be displayed to the user via a suitable user interface, e.g. a screen. The user interface may be an integral component of a domestic cooking appliance and/or may be included in a user device, such as a smartphone or tablet computer, which is separate to the domestic cooking appliance.

Such a camera is distinguished from the optical range sensor in than the camera provides conventional camera functionality, without itself providing depth/range sensing capability.

In a non-limiting example, the data from the optical range sensor 140, e.g. stereo camera, may be processed by a processor to give details on depth and range, as will be described in more detail herein below.

The processor may, for instance, be configured to augment the image information provided by the additional camera with the data from the optical range sensor 140. In some examples, the processor is configured to generate one or more alerts to the user according to the food preparedness or doneness levels. Such an alert, for example an audio and/or visual alert, may be issued via a user interface included in the apparatus, e.g. via the above-described user interface integrated into the domestic cooking appliance and/or via the above-described user interface included in the user device.

Regarding the food preparedness or doneness levels, the depth information provided by the optical range sensor 140, e.g. in combination with the image information provided by the additional camera, may be utilised to detect shrinkage or expansion of the food in the food chamber 104. The food preparedness or doneness level can thus be estimated based on the detected shrinkage or expansion of the food, e.g. by the processor described herein.

The at least one optical sensing element may comprise a pair of spatially separated image sensors, e.g. comprising one or more imaging array. The pair of image sensors are arranged to receive respective images of the food received in the food chamber 104 reflected thereto by the reflector assembly 142A.

Estimation of the distance to a point on the food received in the food chamber 104 may be based on triangulation: the point on the food and the camera points which each receive (reflected) rays from the food forming a triangle. The camera points may be defined by the respective centers of the two image sensors or image sensing portions. The distance may be determined from the baseline distance between the two camera points and the angle formed by the rays incident on the camera points.

Such an estimation may, for example, be performed by a processor (not visible in FIG. 1) included in the domestic kitchen apparatus 100. This estimation may, for example, form part of the determination by the processor of the at least one parameter relating to a characteristic of the food received in the food chamber 104.

The baseline distance of an optical range sensor, e.g. a stereo camera, may be, for example, 30 to 50 mm, such as 40 mm.

In at least some embodiments, the optical range sensor, e.g. stereo camera, is configured such that the depth range of the stereo camera is 0.2 m to 4 m, such as 0.2 m to 3 m, or 0.3 m to 4 m.

Alternatively or additionally, the largest dimension of the food chamber 104 is, for instance, 0.15 m to 0.35 m, such as 0.2 m to 0.25 m.

Incorporation of optical range sensors 140 into domestic kitchen apparatuses 100 has been found to present challenges, particularly due to the minimum detection distance, in other words the lower limit of the depth range, specified for such optical range sensors 140.

For example, for the optical range sensor mentioned above, e.g. a dual/3D camera, the detection distance/depth range may be about 0.2 m to 4 m, such as 0.2 m to 3 m. The 0.2 m lower limit may be larger than the largest dimension of the food chamber 104, particularly the largest dimension of the food chamber 104 of a domestic cooking appliance, such as an air fryer, a steamer, a pressure cooker, a rice cooker, a soup maker or a blender.

Whilst some optical range sensors, e.g. dual/3D cameras, can be customized in order to reduce the minimum detection distance, e.g. to about 5 cm, sensing difficulties can still be encountered when the food chamber 104 is so full of food that the distance between the optical range sensor is smaller than the minimum detection distance.

Incorporating optical range sensors 140 into domestic kitchen apparatuses 100 can be problematic due to difficulties in focussing an image of the food received in the food chamber 104 onto the at least one optical sensing element of the optical range sensor 140, due to the dimensions of the food chamber 104 being smaller than the minimum focal distance required between the optical sensing element and the food received in the food chamber 104.

For this reason, the domestic kitchen apparatus 100 comprises the reflector assembly 142A arranged to reflect light directed from the food received in the food chamber 104 onto the at least one optical sensing element of the optical range sensor 140.

The reflector assembly 142A may increase the path length between the at least one optical sensing element and the food received in the food chamber 104. This is due to the light directed from the food being required to first travel to the reflector assembly 142A, e.g. reflector lens, and then be reflected from the reflector assembly 142A to the at least one optical sensing element, rather than travelling directly to the at least one optical sensing element. Increasing the path length in this manner may assist to bring it to within the detection distance/depth range of the optical range sensor 140.

The reflector assembly 142A can assist with focussing the image of the food received in the food chamber 104 onto the at least one optical sensing element. The path length extension provided by the reflector assembly 142A may further assist in covering a proximal part of the scene within the food chamber 104, e.g. the entirety of the food chamber 104. The width of the view at a certain distance is proportional to the distance and the viewing angle, which may be fixed for a fixed optics range sensor 140, e.g. dual/3D camera.

The detection distance/depth range of the optical range sensor 140 may have a lower limit which is larger than the largest dimension and/or height dimension of the food chamber 104. This may risk hampering optical range sensing in an apparatus in which light from the food is directly incident on the optical sensing element(s), even with such an element or elements being positioned in the food chamber as far away as possible from the food. However, this potential problem is alleviated by the increased path length to the at least one optical sensing element provided by the reflector assembly 142A.

In an embodiment, the range of path lengths to the at least one optical sensing element, via the reflector assembly, defined from a base of the food chamber 104 to from a level of maximum capacity of the food chamber may satisfy the detection distance/depth range of the optical range sensor 140. Thus, the optical range sensor 140 can estimate depth irrespective of the degree of filling of the food chamber 104.

In an embodiment, the optical range sensor 140 and/or the reflector assembly 142A is or are integral, in other words built-in, to the domestic kitchen apparatus 100. For example, the domestic kitchen apparatus 100 may be in the form of a domestic cooking appliance in which at least one of the optical range sensor 140 and the reflector assembly 142A is or are integral to the domestic cooking appliance, as schematically depicted in FIG. 1.

In alternative examples, the optical range sensor 140 may be a removable or detachable component of the domestic kitchen apparatus 100. A window into the food chamber may be provided, e.g. at the sidewall area 110. The optical range sensor 140 may be arranged adjacent the window in order to assemble the domestic kitchen apparatus 100. The reflector assembly 142A may be arranged to reflect light from the food received in the food chamber 104 towards the window. In this manner, the light from the food received in the food chamber 104 may be reflected onto the at least one optical sensing element when the optical range sensor is arranged adjacent the window.

For instance, the optical range sensor 140, and optionally at least one of a light source and the above-described processor, may be included in a separate user device, such as a smart phone or tablet computer. The domestic kitchen apparatus 100 may be assembled by arranging the at least one optical sensing element of the optical range sensor 140 of the user device adjacent the window into the food chamber 104.

When the user device includes the processor, the estimation of the distance to one or more points on the food received in the food chamber 104 and/or the at least one parameter may be implemented via an application run on and/or accessible via the user device.

More generally, the optical sensing element may represent a relatively delicate and sensitive component of the domestic kitchen apparatus 100. Returning to the non-limiting example shown in FIG. 1, the at least one optical sensing element is arranged such that the predominant airflow direction extends across the at least one optical sensing element. By the airflow being directed across, rather than towards, the at least one optical sensing element, the optical sensing element may be better protected from damage and/or interference due to the circulating hot air.

In the non-limiting example depicted in FIG. 1, the at least one optical sensing element is arranged at the sidewall area 110A. In this particular example, the predominant airflow direction through the food chamber 104 is between the opposing end wall areas in which the first and second openings 106, 108 are respectively defined, as previously described. Thus, arranging the at least one optical sensing element at the sidewall area 110A extending between the opposing end wall areas causes the predominant airflow direction to extend across the at least one optical sensing element.

Moreover, the heater 114 may be arranged proximal one of the opposing end wall areas, and is proximal to the end wall area delimiting the first opening 106 in the example shown in FIG. 1. The spatial separation from the heater 114 resulting from arranging the at least one optical sensing element at the sidewall area 110A in this example can assist to protect the at least one optical sensing element from damage and/or interference with may otherwise result from being in close proximity with the heater 114.

Moreover, spacing the at least one optical sensing element apart from the heater 114 in this manner may assist to simplify the architecture of the domestic kitchen apparatus 100.

In an alternative embodiment, the at least one optical sensing element of the optical range sensor 140 is arranged, e.g. mounted, at the wall 102 defining the outer chamber of the domestic kitchen apparatus 100. Thus, the at least one optical sensing element may be set back from the food chamber 104, which may assist to protect the at least one optical sensing element from damage and/or interference associated with the cooking process taking place within the food chamber 104.

Figure 2:
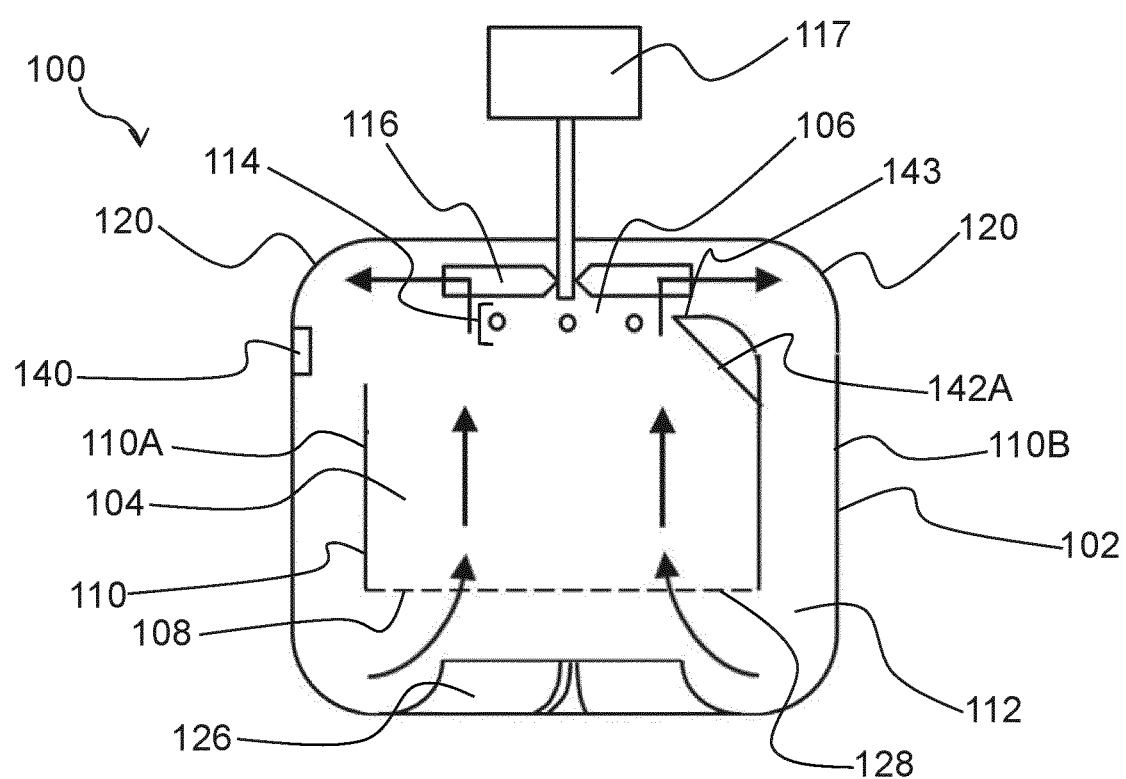
FIG. 2 provides a schematic cross-sectional view of a domestic kitchen apparatus according to a second example.

An example of this is schematically depicted in FIG. 2. The at least one optical sensing element of the optical range sensor 140 is mounted at the wall 102 such that the predominant airflow direction through the duct 112 extends across the at least one optical sensing element, as shown. This assists to minimise damage and/or interference caused to the at least one optical sensing element caused by the circulating hot air, relative to the scenario in which the predominant airflow direction is towards the at least one optical sensing element, as previously described.

It is also noted that in the non-limiting example shown in FIG. 2, the domestic kitchen apparatus 100 is configured such that the path of reflected light from the reflector assembly 142A towards the at least one optical sensing element of the optical range sensor 140 is not impeded by the further wall 110. In this respect, at least part of the wall member 118 present in the example depicted in FIG. 1 is removed in the example depicted in FIG. 2 in order that the light reflected from the reflector assembly 142A can reach the at least one optical sensing element.

The reflector assembly 142A may be arranged across the food chamber 104 from the at least one optical sensing element of the optical range sensor 140.

In the non-limiting examples depicted in FIGS. 1 and 2, a reflective, e.g. mirror, surface of the reflector assembly 142A extends at an angle from a further sidewall area 110B (which opposes the sidewall area 110A at which the at least one optical sensing element is arranged) towards the end wall area 143 opposing the food received in the food chamber 104. In the examples shown in FIGS. 1 and 2, the reflective surface extends from the further sidewall area 110B towards the end wall area 143 delimiting the first opening 106.

It should, however, be appreciated that any suitable arrangement of the reflector assembly 142A can be considered provided that the reflector assembly 142A can reflect light from the food received in the food chamber 104 onto the at least one optical element of the optical range sensor 140. It is noted that, for example, the reflector assembly 142A can be alternatively arranged, e.g. mounted, at the wall 102 defining the outer chamber of the domestic kitchen apparatus 100. Further exemplary arrangements of the reflector assembly 142A will be explained in more detail herein below with reference to FIGS. 3 to 6.

More generally, each of the at least one optical sensing element or the optical range sensor 140 as a whole may be provided with a heat resistive coating and/or may be enclosed in a heat resistive compartment for protection from the heat which may be generated within the domestic kitchen apparatus 100. At least a portion of the coating or the compartment may be optically transparent in order that light can reach the at least one optical sensing element.

Alternatively or additionally, a heat resistive coating and/or heat resistive compartment may be employed to coat or house at least a portion of the reflector assembly 142A. At least a portion of the heat resistive coating or the heat resistive compartment may be optically transparent in order that the reflector assembly 142A can receive light from the food in the food chamber 104 and direct the light towards the at least one optical sensing element.

In an embodiment, the reflector assembly 142A comprises, or takes the form of, a reflector lens. The reflector lens is arranged to reflect light from the food received in the food chamber 104 onto the at least one optical sensing element of the optical range sensor 140.

The reflector lens of the reflector assembly 142A may, for example, be at an angle of 30° to 60°, such as about 45°, relative to the surface of the end wall area 143 towards which the reflector lens extends from the (further) sidewall area 110B.

Figure 3:
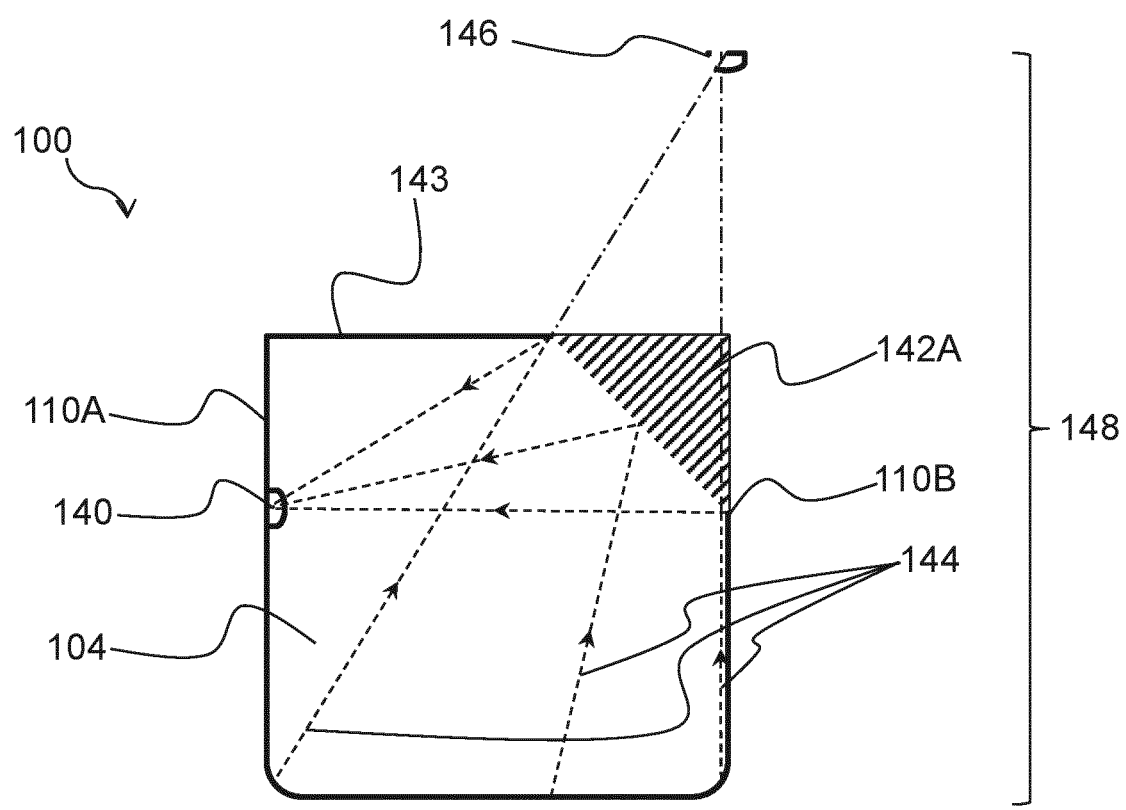
FIG. 3 schematically depicts a domestic kitchen apparatus according to a third example.

In the non-limiting example shown in FIG. 3, the reflector lens of the reflector assembly 142A is mounted to one upper corner of the food chamber 104, and the reflection plane is about 45° to the horizontal surface of the end wall area 143.

The optical range sensor 140, e.g. stereo camera, is placed at, e.g. mounted on, the sidewall area 110A diagonally opposing the reflector lens, as shown in FIG. 3. The light path from the food received in the food chamber 104 is represented in FIG. 3 by the arrows 144. FIG. 3 also schematically shows a virtual image 146 of the optical range sensor 140, e.g. dual/3D camera, and shows the detection distance 148.

In some embodiments, the food chamber 104 has width, length and height dimensions, and the sum of the height and width dimensions or the sum of the height and length dimensions is equal to or larger than the minimum of the depth range of the optical range sensor 140. This may assist to ensure that the path length extension provided by the reflector assembly 142A satisfies the minimum depth range of the optical range sensor 140.

With the design shown in FIG. 3, the height of the food chamber 104, e.g. 0.2 m to 0.25 m, plus the diameter/width of the food chamber 104, e.g. 0.2 m to 0.25 m, may be approximately equal to the actual length of the optical path, e.g. 0.4 m to 0.5 m, from the food object received in the food chamber 104 to the at least one optical sensing element of the optical range sensor 140, e.g. the dual/3D camera. This detection distance 148 can ensure that the optical range sensor 140, e.g. the dual/3D camera, is permitted to effectively estimate the distance to one or more points on the food received in the food chamber 104.

In order for the optical range sensor 140 to capture the whole view of the bottom of the food chamber 104 at once, the reflective surface of a static reflector assembly 142A would have to be sufficiently large. However, due to the limited space within the domestic kitchen apparatus 100, such a relatively large reflective surface may be impractical.

Figure 4:
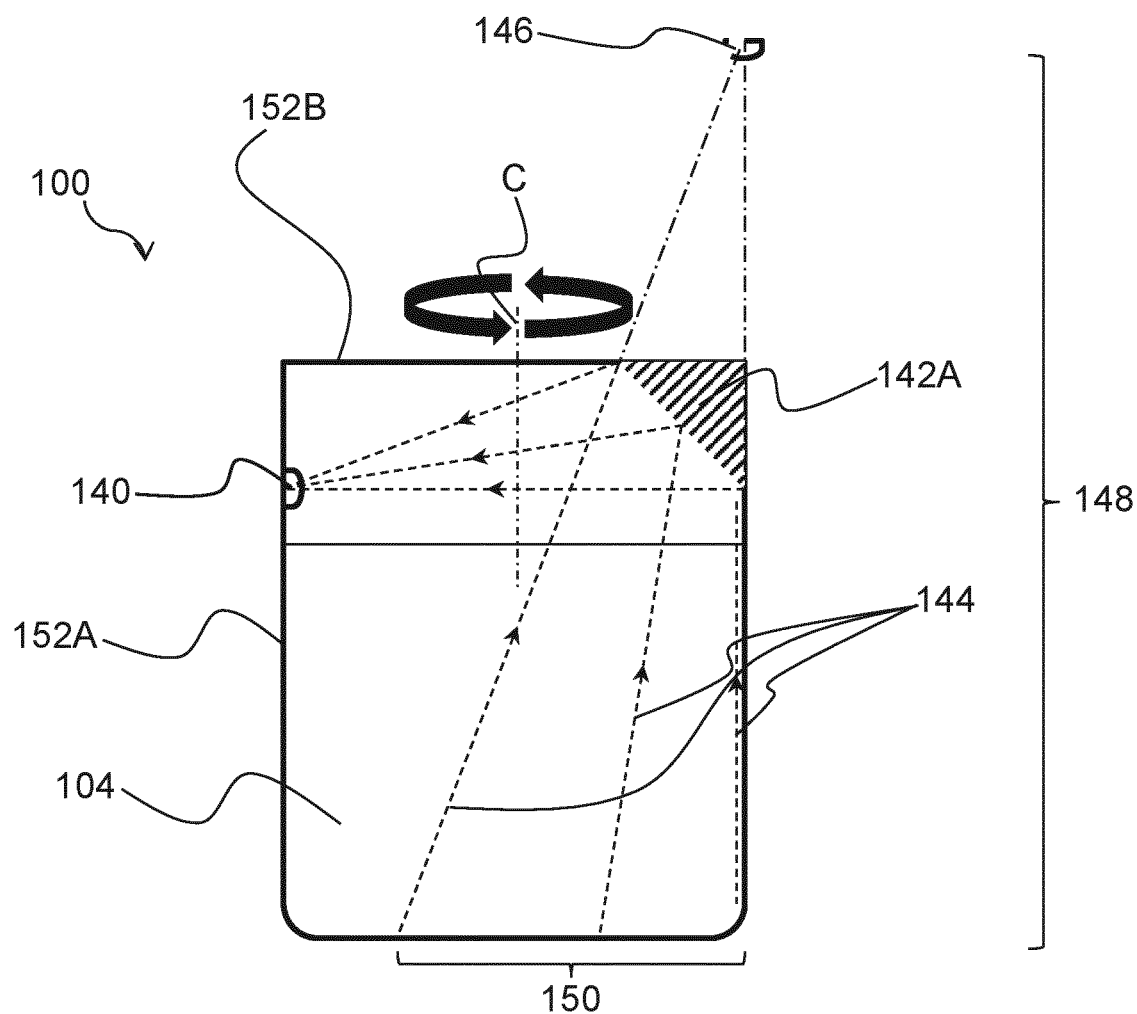
FIG. 4 schematically depicts a domestic kitchen apparatus according to a fourth example.

FIG. 4 shows a detection region 150 corresponding to a portion of the food chamber 104 being captured by the optical range sensor 140. However, in this embodiment the food chamber 104 is defined by a first part 152A for receiving the food, and a second part 152B on which the optical range sensor 140 and the reflector assembly 142A are arranged. The first and second parts 152A, 152B are moveable relative to each other such as to permit light directed from different areas of the food received in the food chamber 104 to be incident on the reflector assembly 142A and reflected onto the at least one optical sensing element. This may enable more of the food chamber 104 to be captured by the optical range sensor 140.

In the non-limiting example shown in FIG. 4, the first and second parts 152A, 152B are rotatable relative to each other such as to permit light directed from different areas of the food received in the food chamber 104 to be incident on the reflector assembly 142A and reflected onto the at least one optical sensing element.

The second part 152B may, for example, define a lid of the food chamber 104, and the first part 152A may define a body of the food chamber 104. The lid may be moveable, e.g. rotatable, with respect to a centre axis C of the body, as shown in FIG. 4.

Figure 5:
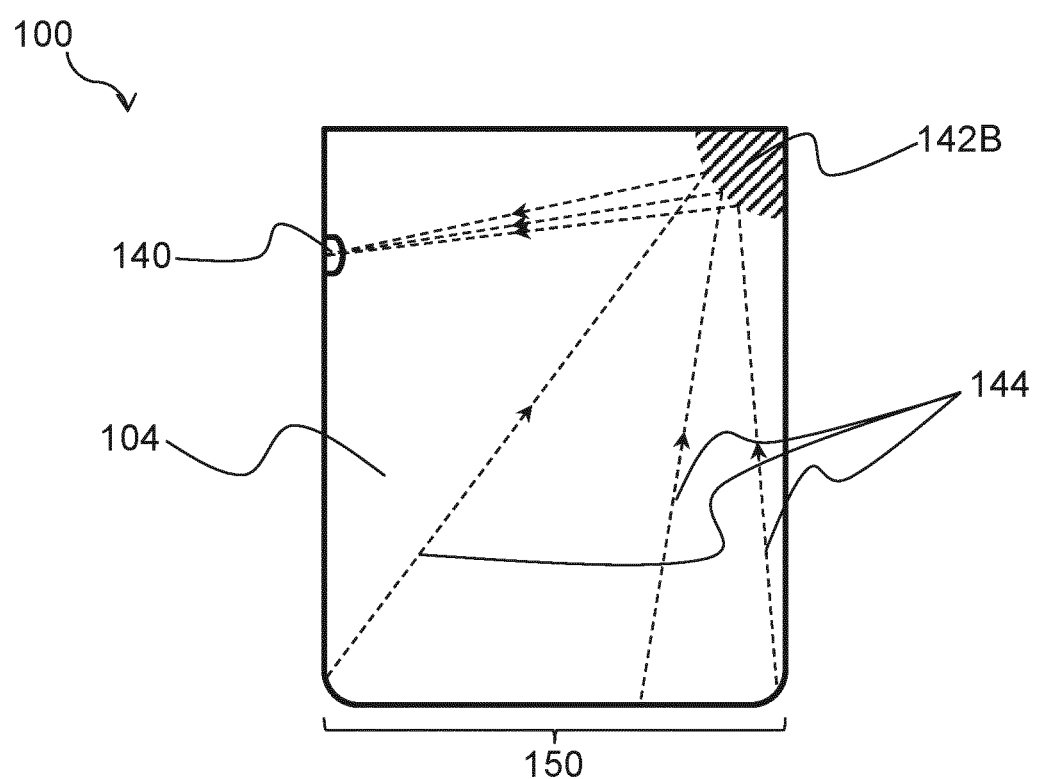
FIG. 5 schematically depicts a domestic kitchen apparatus according to a fifth example.

Referring to the non-limiting example shown in FIG. 5, the reflector assembly 142B comprises a curved reflector lens arranged to focus the light directed from the food received in the food chamber 104 towards the at least one optical sensing element. Such a curved reflector lens, e.g. comprising or in the form of a parabolic reflector, may assist to extend the view of the food chamber 104 provided to the optical range sensor 140, as shown.

Whilst the curved reflector may result in some distortion of the image captured by the optical range sensor 140, such image distortion may be, for instance, be compensated by employing a suitable algorithm, e.g. implemented by the processor, for reconstructing the image and adjusting the distance calculation. Such an algorithm may assist to mitigate the risk of image recognition and/or volume estimation deterioration resulting from the image distortion caused by the curved reflector.

Figure 6:
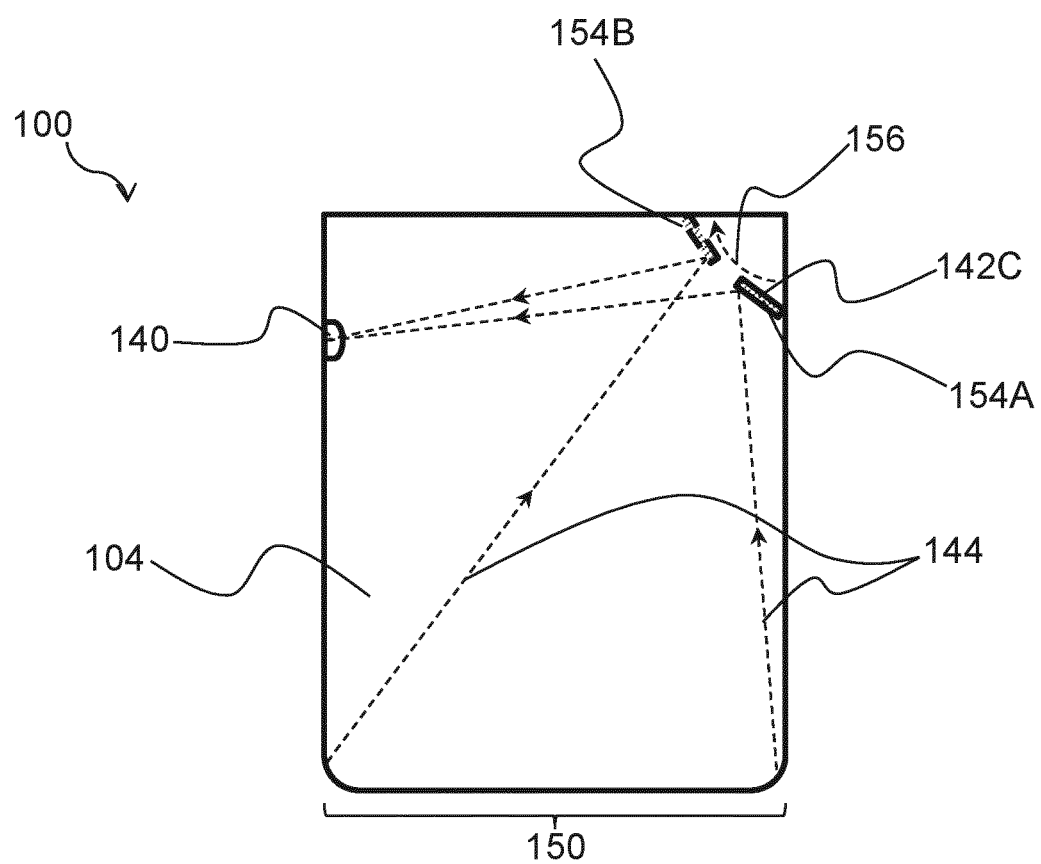
FIG. 6 schematically depicts a domestic kitchen apparatus according to a sixth example.

FIG. 6 schematically depicts a non-limiting example in which the reflector assembly 142C comprises at least one reflective surface which is moveable relative to the food chamber 104 such as to permit light directed from different areas of the food received in the food chamber 104 to be reflected onto the at least one optical sensing element.

As shown in FIG. 6, the reflective surface is moveable from a first position 154A to a second position 154B in the direction of the arrow 156 in order to permit light from different areas of the food received in the food chamber 104 to be reflected onto the at least one optical sensing element. Such a moveable reflective surface may assist to increase the breadth of the detection region 150. A planar reflective surface may, for instance, be employed in this example, thereby to assist in reducing any image distortion, e.g. relative to the scenario in which the curved reflector lens is included in the reflector assembly 142B.

The curved reflector lens of the reflector assembly 142B shown in FIG. 5 and the moveable reflective surface of the reflector assembly 142C shown in FIG. 6 may benefit from providing a relatively simple and correspondingly lower cost architecture, for example in comparison to the exemplary domestic kitchen apparatus 100 having first and second moveable parts 152A, 152B shown in FIG. 4.

In a further non-limiting example, the domestic kitchen apparatus 100 comprises a reflector assembly 142A, 142B, 142C having two or more reflectors at different positions from each other in the domestic kitchen apparatus 100, e.g. at different positions from each other in the food chamber 104.

The reflector assembly 142A, 142B, 142C may, for instance, include reflectors at, e.g. integrated into, opposite corners of the food chamber 104. The optical range sensor 140, e.g. dual/3D camera, may be mounted at a sidewall area 110A to receive twice (or more) the reflected light. The design can extend the optical path to meet the minimum depth range requirement of the optical range sensor 140, e.g. dual/3D camera.

Figure 7:
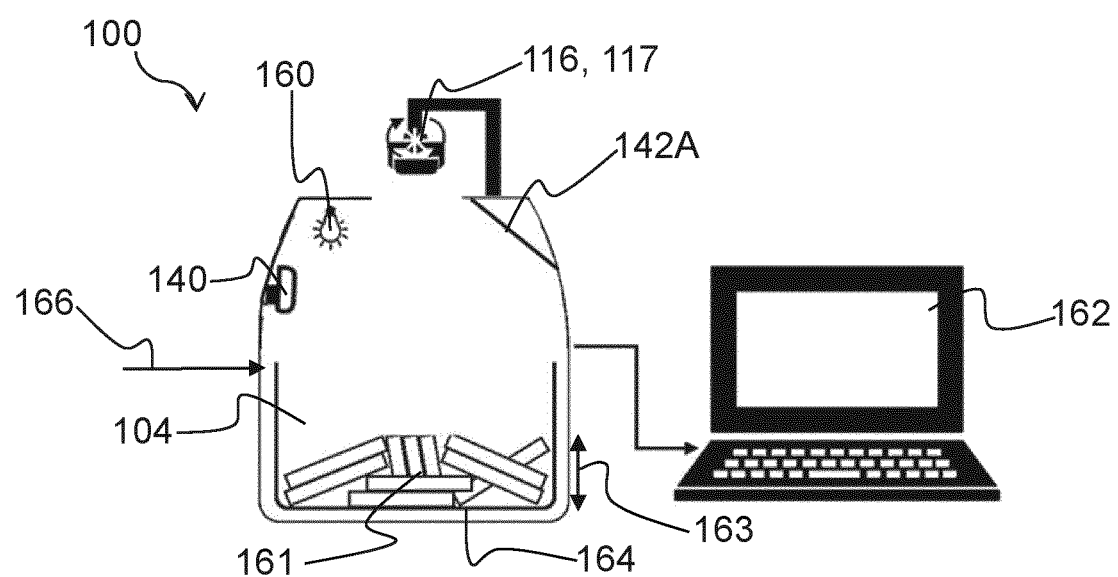
FIG. 7 schematically depicts a domestic kitchen apparatus according to a seventh example.

In an embodiment, the optical range sensor 140 comprises a light source 160 for illuminating the food 161 received in the food chamber 104. Such a light source 160 is schematically depicted in FIG. 7. The light source 160 may assist to ensure that sufficient light is directed from the food 161 to the reflector assembly 142A for the optical range sensor 140 to be able to operate. Any suitable light source 160, e.g. a visible light and/or infra-red light source, can be used for this purpose.

In a non-limiting example, the light source 160 comprises a projector spaced apart from each of the at least one optical sensing element, which projector is configured to emit structured light towards the food 161 received in the food chamber 104. Such structured light being projected to the food 161, directed from the food 161 to the reflector assembly 142A, and reflected onto the at least one optical sensing element, may be utilised for the optical range sensing, e.g. using a so-called active triangulation optical range sensing principle.

FIG. 7 also shows the processor 162 configured to estimate the distance to one or more points on the food 161 received in the food chamber 104 and/or to determine at least one parameter relating to a characteristic of the food received in the food chamber 104 based on the range sensed by the optical range sensor 140.

The at least one parameter may, for example, comprise a filling dimension 163 of the food received in the food chamber 104 from a base 164 of the food chamber 104 towards a maximum filling level 166 of the food chamber 104. In some examples, the at least one parameter comprises a volume of the food 161 received in the food chamber 104.

The processor 162 can be implemented in numerous ways, with software and/or hardware, to perform the various functions required. The processor 162 may, for example, employ one or more microprocessors programmed using software (e.g., microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In various implementations, the processor 162 may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into the processor 162.

Figure 8:
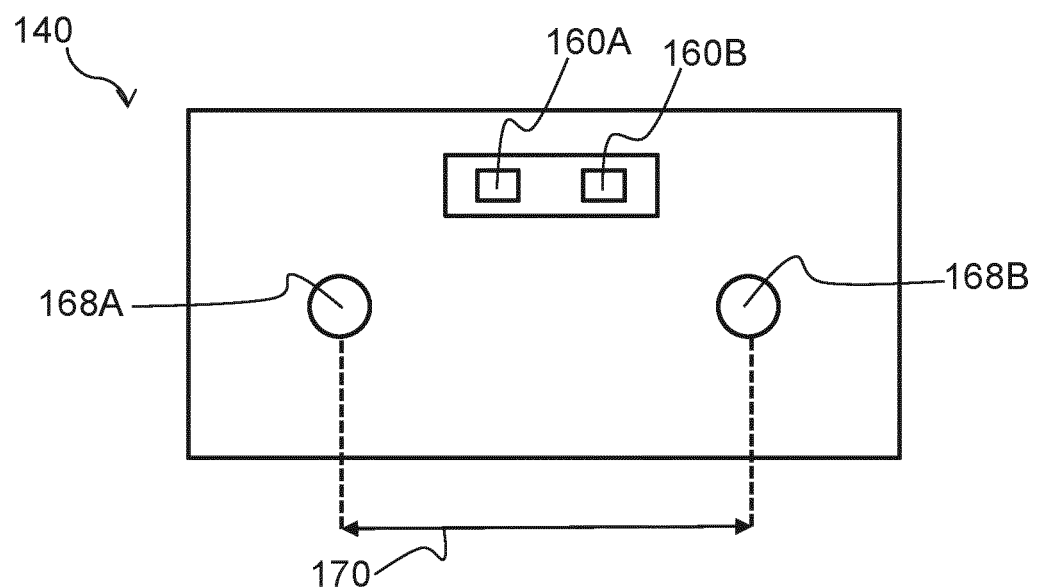
FIG. 8 schematically depicts an optical range sensor according to an example.

FIG. 8 provides a front face schematic view of the optical range sensor 140 according to an example. The optical range sensor 140 in this example comprises two optical sensing elements, for instance a pair of spatially separated image sensors 168A, 168B. The image sensors 168A, 168B are separated from each other by a baseline distance 170 of 40 mm in this example. The depth range of this exemplary optical range sensor 140 is 0.2 m to 3 m.

The optical range sensor 140 depicted in FIG. 8 further comprises a pair of infra-red light projectors 160A, 160B as the light source 160.

A specific non-limiting example of the optical range sensor 140 depicted in FIG. 8 is the MYNT EYE D-1200 from MYNT, which has near infra-red speckle enhanced stereovision camera modules.

An alternative specific non-limiting example of an optical range sensor 140 is the Orbbec Dabai from Orbbec. This model is a structured light dual camera, and similarly to the MYNT EYE D-1200 has infra-red speckle enhanced stereovision capability. This optical range sensor 140 has a baseline distance 170 of 40 mm, and a depth range of 0.3 m to 4 m.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A domestic kitchen apparatus, comprising:
a food chamber for receiving food;
an optical range sensor configured for optical range sensing, the optical range sensor is configured to have a depth range whose lower limit is larger than a largest dimension and/or a height dimension of the food chamber, wherein the optical range sensor has at least one optical sensing element; and
a reflector assembly, wherein the reflector assembly is arranged to reflect light directed from the food received in the food chamber onto the at least one optical sensing element, wherein the optical range sensor comprises a stereo camera configured to acquire two or more input images of the food from the light reflected thereto by the reflector assembly.

2. The domestic kitchen apparatus according to claim 1, wherein the lower limit of the depth range is 0.2 m to 0.3 m; and/or the largest dimension of the food chamber is 0.15 m to 0.25 m; and/or the height dimension of the food chamber is 0.15 m to 0.25 m.

3. The domestic kitchen apparatus according to claim 1, wherein the food chamber has width and length dimensions, and wherein a sum of the height and the width dimensions or a sum of the height and the length dimensions is equal to or larger than the lower limit of the depth range of the optical range sensor.

4. The domestic kitchen apparatus according to claim 1, wherein a range of path lengths to the at least one optical sensing element via the reflector assembly is defined from a base of the food chamber to a level of maximum capacity of the food chamber, and wherein the optical range sensor is configured to have a depth range which is satisfied by said range of path lengths.

5. The domestic kitchen apparatus according to claim 1, wherein the optical range sensor comprises a light source for illuminating the food received in the food chamber, optionally wherein the light source comprises a projector spaced apart from each of the at least one optical sensing element, which the projector is configured to emit structured light towards the food received in the food chamber.

6. The domestic kitchen apparatus according to claim 1, wherein:
the food chamber is defined by a first part for receiving the food, and a second part on which the optical range sensor and the reflector assembly are arranged, and
the first and the second parts are moveable relative to each other such as to permit the light directed from different areas of the food received in the food chamber to be incident on the reflector assembly and reflected onto the at least one optical sensing element, optionally
the first and the second parts are rotatable, with respect to a centre axis of the first part, relative to each other such as to permit the light directed from the different areas of the food received in the food chamber to be incident on the reflector assembly and reflected onto the at least one optical sensing element.

7. The domestic kitchen apparatus according to claim 1, wherein the reflector assembly comprises a curved reflector lens arranged to focus the light directed from said food received in the food chamber towards the at least one optical sensing element.

8. The domestic kitchen apparatus according to claim 1, wherein the reflector assembly comprises at least one reflective surface which is moveable relative to the food chamber such as to permit the light directed from different areas of the food received in the food chamber to be reflected onto the at least one optical sensing element.

9. The domestic kitchen apparatus according to claim 1, comprising:
a heater; and
a circulation system configured to define a predominant airflow direction through the domestic kitchen apparatus and past the heater, wherein the optical range sensor is arranged such that said predominant airflow direction extends across the at least one optical sensing element.

10. The domestic kitchen apparatus according to claim 1, wherein the food chamber is at least partly defined by a sidewall area extending between opposing end wall areas.

11. The domestic kitchen apparatus according to claim 1, comprising an outer chamber defined by a wall, the food chamber being provided inside the outer chamber.

12. The domestic kitchen apparatus according to claim 10, wherein the at least one optical sensing element is arranged at said sidewall area or at a wall, and/or wherein the reflector assembly is arranged at said wall or at said sidewall area.

13. The domestic kitchen apparatus according to claim 1, comprising or in the form of a domestic kitchen appliance, optionally wherein the domestic kitchen appliance is an air fryer, a steamer, a pressure cooker, a rice cooker, a soup maker, or a blender.

\* \* \* \* \*